(12) United States Patent
Ambrister et al.

(10) Patent No.: US 11,451,038 B2
(45) Date of Patent: Sep. 20, 2022

(54) SYSTEM, METHOD AND APPARATUS FOR POSITIONING AND TRAINING FLEXIBLE JUMPERS

(71) Applicant: Valmont Industries, Inc., Omaha, NE (US)

(72) Inventors: Charles S. Ambrister, South Tulsa, OK (US); Keven W. Carroll, Elbert, CO (US); Shannon R. Eggert, Lincoln, NE (US); David J. Preston, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 448 days.

(21) Appl. No.: 16/744,723

(22) Filed: Jan. 16, 2020

(65) Prior Publication Data

US 2020/0244051 A1 Jul. 30, 2020

Related U.S. Application Data

(60) Provisional application No. 62/796,134, filed on Jan. 24, 2019.

(51) Int. Cl.
*H02G 7/20* (2006.01)
*H02G 7/00* (2006.01)
(Continued)

(52) U.S. Cl.
CPC ............... *H02G 7/20* (2013.01); *H02G 1/02* (2013.01); *H02G 7/00* (2013.01); *H02G 7/02* (2013.01);
(Continued)

(58) Field of Classification Search
CPC .. H02G 7/20; H02G 1/02; H02G 7/00; H02G 7/05; H02G 7/205; H02G 1/00;
(Continued)

(56) References Cited

U.S. PATENT DOCUMENTS 1,822,693 A * 9/1931 Dibner ................... H01R 11/12
439/804
1,828,306 A 10/1931 Austin
(Continued)

FOREIGN PATENT DOCUMENTS

JP H01315214 A 12/1989
JP H10178721 A 6/1998
(Continued)

*Primary Examiner* — Angel R Estrada
(74) *Attorney, Agent, or Firm* — Milligan PC LLO

(57) ABSTRACT

The present invention includes a flexible jumper jig which is reconfigurable to replicate the end positions of a flexible jumper as it would be on an installed substation. According to a further preferred embodiment, an exemplary system of the present invention may include a framework forming three orthogonal axes and repositionable tooling mounts for end fittings. According to another aspect of the present invention, an x-axis oriented rail may preferably hold a tooling mount which is configurable to be rotated about its axis to allow for alternate tooling mount orientations. Further, a y-axis oriented rail may be perpendicular to the x-axis rail and may be fixed. Still further, a z-axis oriented rail may be perpendicular to and slide along the y-axis rail. Additionally, a second tooling mount may be attached to the z-axis rail.

20 Claims, 16 Drawing Sheets

(51) Int. Cl.
*H02G 7/02* (2006.01)
*H02G 1/02* (2006.01)
*H02G 7/05* (2006.01)
*H02G 1/00* (2006.01)

(52) U.S. Cl.
CPC ............... *H02G 7/05* (2013.01); *H02G 7/205* (2013.01); *H02G 1/00* (2013.01)

(58) Field of Classification Search
CPC ... H02G 3/30; H02G 7/02; H02B 5/00; H02B 1/52; H02B 3/00; H02B 7/06; H02J 3/18; H02J 3/1814
USPC .......... 174/50, 520, 59, 60, 64, 135; 269/37; 307/104, 149; 323/215, 346, 355, 358, 323/359, 363, 371; 336/68, 107, 137, 336/173, 192; 361/35, 600, 601, 602, 361/603; 439/1, 10, 151, 162, 296, 310, 439/338, 342, 374, 449, 451, 500, 507, 439/952
See application file for complete search history.

(56) References Cited

U.S. PATENT DOCUMENTS

| | | | |
|---|---|---|---|
| 3,556,310 A | * | 1/1971 | Loukotsky ............... H02B 5/00 |
| | | | 211/189 |
| 3,672,636 A | | 6/1972 | Parsen |
| 3,728,661 A | | 4/1973 | Kassabgi |
| 5,524,869 A | | 6/1996 | Asplin |
| 5,727,777 A | | 3/1998 | Chikiri et al. |
| 5,979,880 A | | 11/1999 | Chikiri et al. |
| 6,517,052 B1 | | 2/2003 | Lake |
| 2005/0070150 A1 | * | 3/2005 | Williams ............... E21B 33/038 |
| | | | 439/374 |
| 2009/0065750 A1 | | 3/2009 | Theisen |
| 2014/0273612 A1 | * | 9/2014 | Kameda ............... H01R 13/6395 |
| | | | 439/507 |
| 2015/0000104 A1 | | 1/2015 | DePue |

FOREIGN PATENT DOCUMENTS

| | | |
|---|---|---|
| JP | H11187526 A | 7/1999 |
| JP | 2012217300 A | 11/2012 |

* cited by examiner

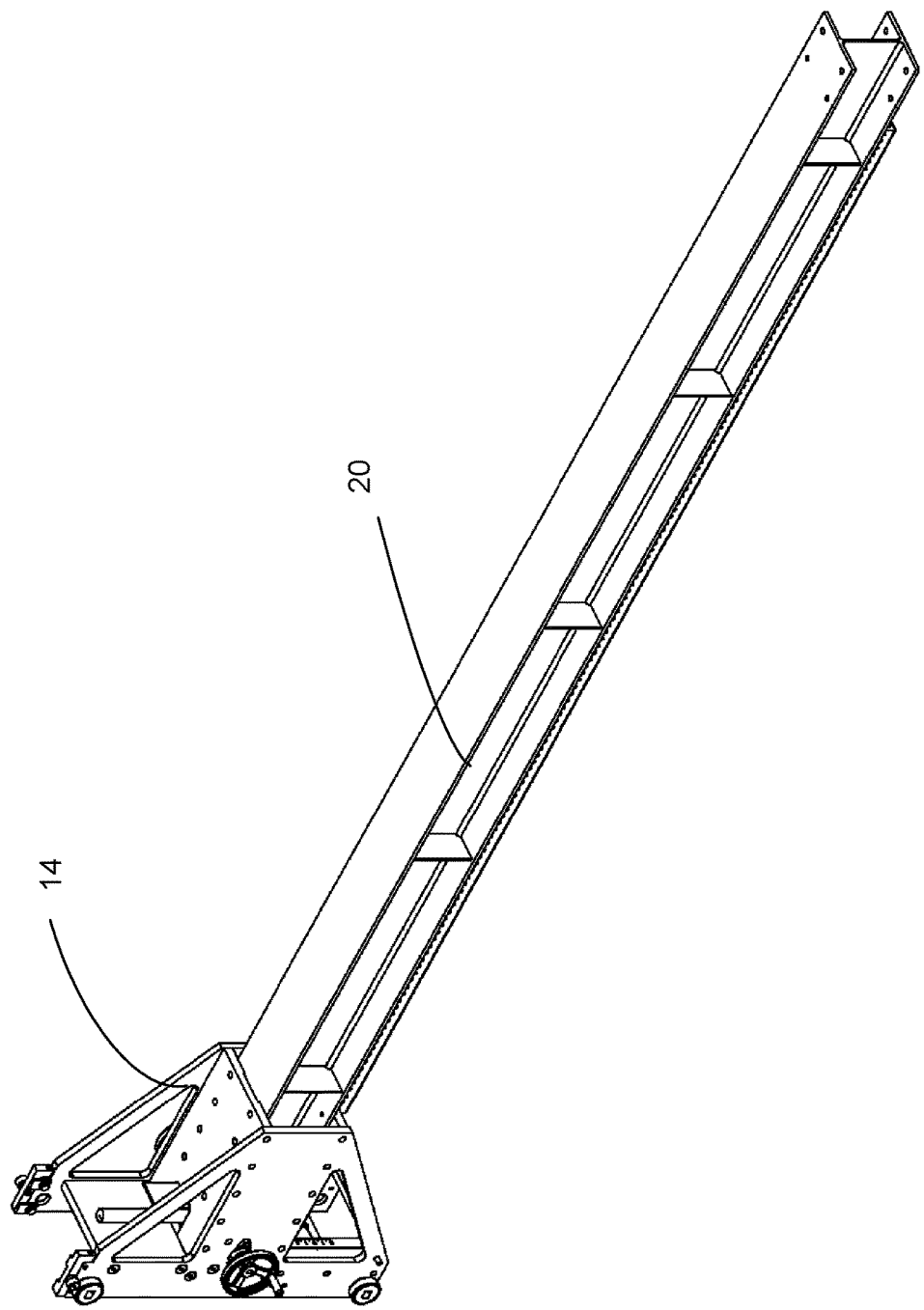

SYSTEM, METHOD AND APPARATUS FOR POSITIONING AND TRAINING FLEXIBLE JUMPERS

RELATED APPLICATIONS

The present invention claims priority to U.S. Provisional Application No. 62/796,134 filed Jan. 24, 2019.

BACKGROUND AND FIELD OF THE PRESENT INVENTION

Field of the Present Invention

The present invention relates generally to electrical jumpers. More specifically, the present invention relates to a system, method and apparatus for positioning and training prefabricated, flexible jumpers.

Background of the Invention

Substations generally operate to transform voltages within electrical distribution systems. Substations are connected to electrical systems by connecting wires or jumpers. Jumpers attach between substation terminal mounts and terminal mounts electrically connected to larger electrical systems. Jumpers that can be repositioned and shaped are referred to as flexible jumpers.

Electrical substations are increasingly prefabricated and transported to a given location for installation. Once installed, flexible jumpers are attached. Commonly, the flexible jumpers are built on the finally erected substation structure. Alternatively, they are built on a work bench or "one ended" off-site and finished in the field on an erected substation. Each of these methods creates significant delays and extra costs during substation installation. Specifically, work benches don't allow for the jumpers to be positioned as they would be on the installed substation. This causes jumpers to be built out of position and with no means to train the cable between ends. Further, the alternative of building a one ended jumper and finishing it in the field requires more material and labor than building a jumper all at once.

Accordingly, what is needed is an improved system, method and apparatus for positioning and training flexible jumpers to overcome the limitations of the prior art. In particular, what is needed is a system that allows jumpers to be built without an erected substation, in a controlled production environment, and positioned on the substation taking into account cable routing, gravity and other factors.

SUMMARY OF THE DISCLOSURE

To minimize the limitations found in the prior art, and to minimize other limitations that will be apparent upon the reading of the specifications, the preferred embodiment of the present invention provides an improved system, method and apparatus for positioning and training prefabricated, flexible jumpers. According to a first preferred embodiment, the present invention includes a flexible jumper jig which is reconfigurable to replicate the end positions of a flexible jumper as it would be on an installed substation thus allowing for the flexible jumper to be completely fabricated off-site.

According to a further preferred embodiment, an exemplary system of the present invention may include a framework forming three orthogonal axes and repositionable tooling mounts for end fittings. According to another aspect of the present invention, an x-axis oriented rail may preferably hold a tooling mount which is configurable to be rotated about its axis to allow for alternate tooling mount orientations. Additionally, a y-axis oriented rail may be perpendicular to the x-axis rail and may be fixed. Still further, a z-axis oriented rail may be perpendicular to and slide along the y-axis rail. Additionally, a second tooling mount may be attached to the z-axis rail. Preferably, all tooling mounts and movable rails may be bolted and/or pinned in place once positioned.

According to further aspects of the present invention, a variety of tooling mounts and adapters may be used with the present invention. These may include offset, rotary angle, and compound angle tooling mount adapters which may preferably allow connection points and end fittings to be rotated, titled and positioned as needed.

These and other advantages and features of the present invention are described with specificity in the descriptions below to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness. It should be understood that the scope of the present invention is intended to be limited solely by the appended claims.

FIG. 4 shows a perspective view of a distal spacing beam in accordance with a first preferred embodiment of the present invention.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized, and changes may be made without departing from the scope of the present invention.

Various inventive features are described below that can each be used independently of one another or in combination with other features. However, any single inventive feature may not address any of the problems discussed above or only address one of the problems discussed above. Furthermore, one or more of the problems discussed above may not be fully addressed by any of the features described below. Additionally, the descriptions of the present invention include references to the x-axis, y-axis, and z axis. It is understood that these axes are labeled relative to each other and not relative to any fixed, outside reference planes. Accordingly, the names of these axes may be changed relative to each other without departing from the scope of the present invention.

Figure 1:
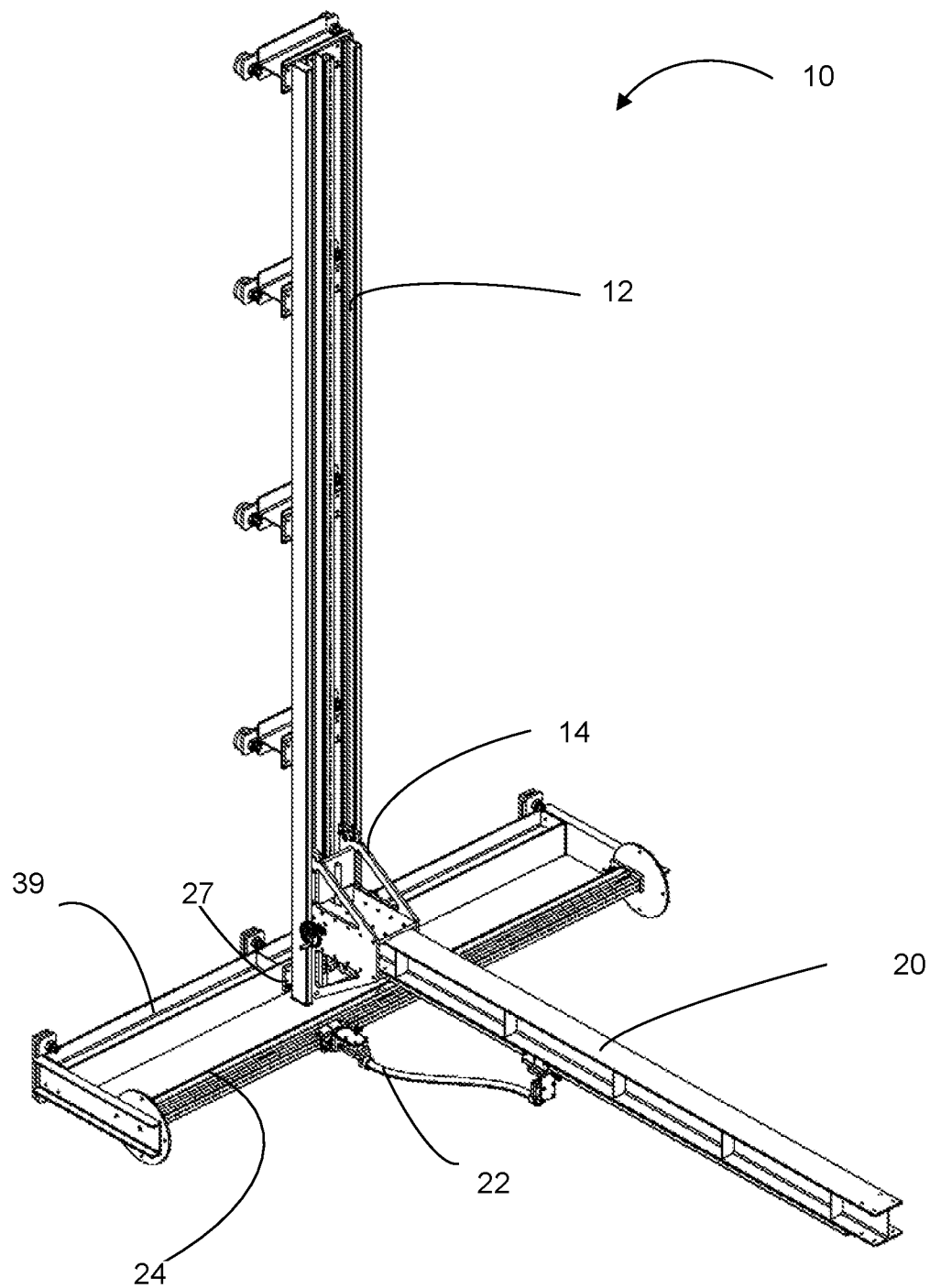
FIG. 1 shows a front view of an exemplary jumper positioning system in accordance with a first preferred embodiment of the present invention.
Figure 2:
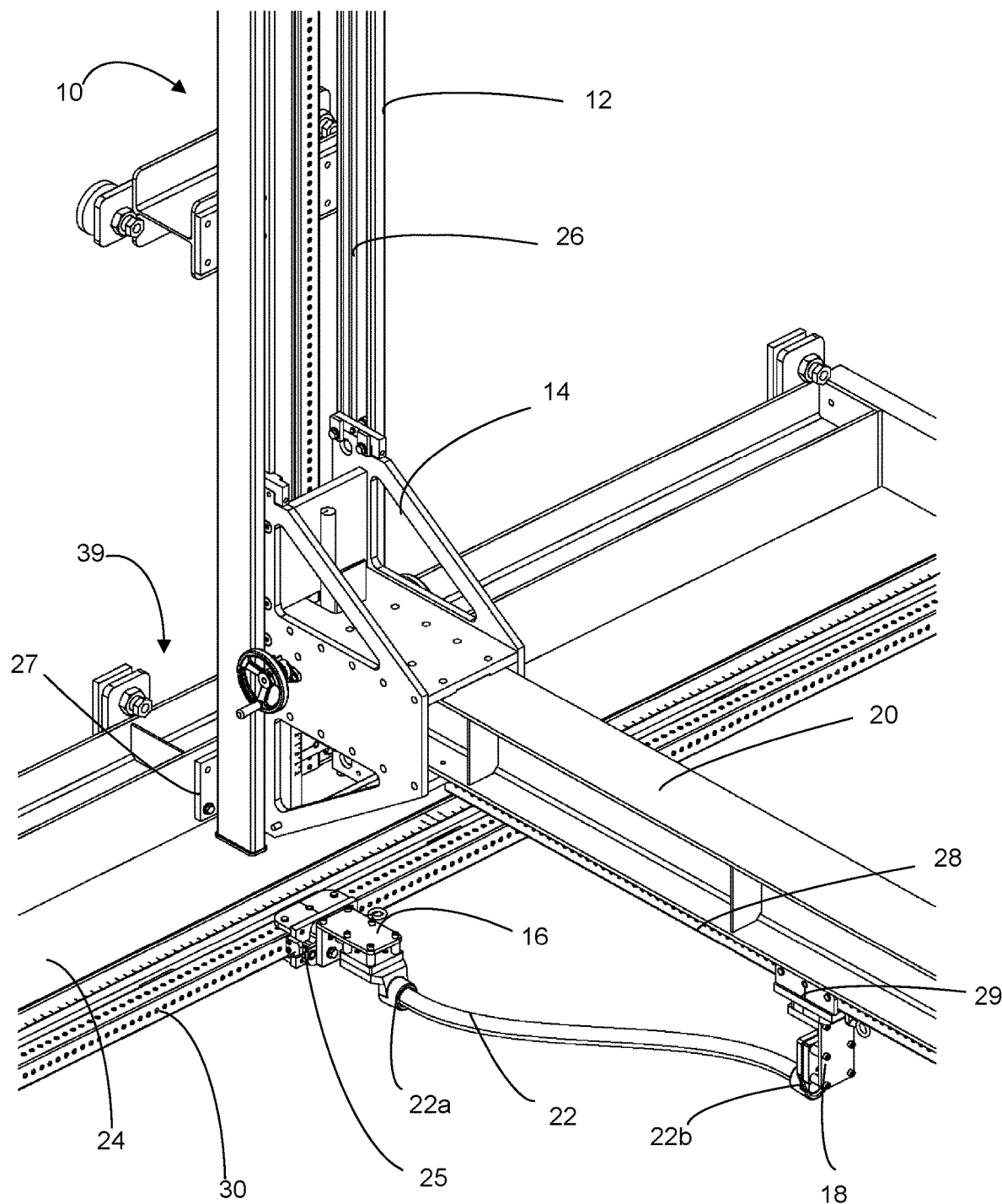
FIG. 2 shows an enlarged view of the exemplary jumper positioning system shown in FIG. 1.

With reference now to FIGS. 1 and 2, an exemplary jumper positioning system 10 in accordance with a first preferred embodiment of the present invention shall now be discussed. FIG. 1 shows a full view of the exemplary jumper positioning system 10, and FIG. 2 shows an enlarged view.

As shown in FIG. 1, the exemplary jumper positioning system 10 of the present preferably includes a vertical positioning beam 12 (y-axis oriented rail) which is secured to a base assembly 39. According to a further preferred embodiment, the vertical positioning beam 12 is secured to a horizontal base beam 24 (x-axis oriented rail) of the base assembly 39 at a securing point 27. As further shown in FIG. 1, the vertical positioning beam 12 is preferably mechanically engaged with a movable vertical locking bracket 14 as discussed further below with respect to FIGS. 2 and 3. Still further, the vertical locking bracket 14 is preferably secured to a distal spacing beam 20 (z-axis oriented rail) which preferably extends away from the vertical positioning beam 12 at an angle which is substantially orthogonal to the orientation of the vertical positioning beam 12.

With reference now to FIG. 2, the elements of the jumper positioning system 10 preferably may function to position and secure the jumper 22 between any two points which are within the three-dimensional space roughly defined by the axes of the vertical positioning beam 12, the distal spacing beam 20 and the horizontal base beam 24. Preferably, the selected two points in the three-dimensional space correspond with the relative positions of the prefabricated sub-station terminal mounts and on-site terminal mounts. As shown in FIG. 2, a first proximal end 22a of the jumper 22 is preferably secured via a tool mount 16 to a horizontal track carriage 25 which is mechanically engaged with a horizontal track 30 which is secured to the horizontal base beam 24 of the base assembly 39. In this way, the first proximal end 22a of the jumper 22 may be positioned and secured anywhere along the axis of the horizontal track 30 by sliding the horizontal track carriage 25 along the horizontal track 30.

As shown, the distal end 22b of the jumper 22 may preferably be secured via a tool mount 18 to the beam track carriage 29 which is slidably attached to a distal spacing beam track 28 which is secured to the distal spacing beam 20. In this way, the distal end 22b of the jumper 22 may be positioned and secured anywhere along the axis of the distal spacing beam track 28 by sliding the beam track carriage 29 along the distal spacing beam track 28. Still further, the vertical locking bracket 14 may slide up and down the vertical track 26 thereby moving the distal spacing beam 20 along the vertical track 26 of the vertical positioning beam 12.

Figure 3:
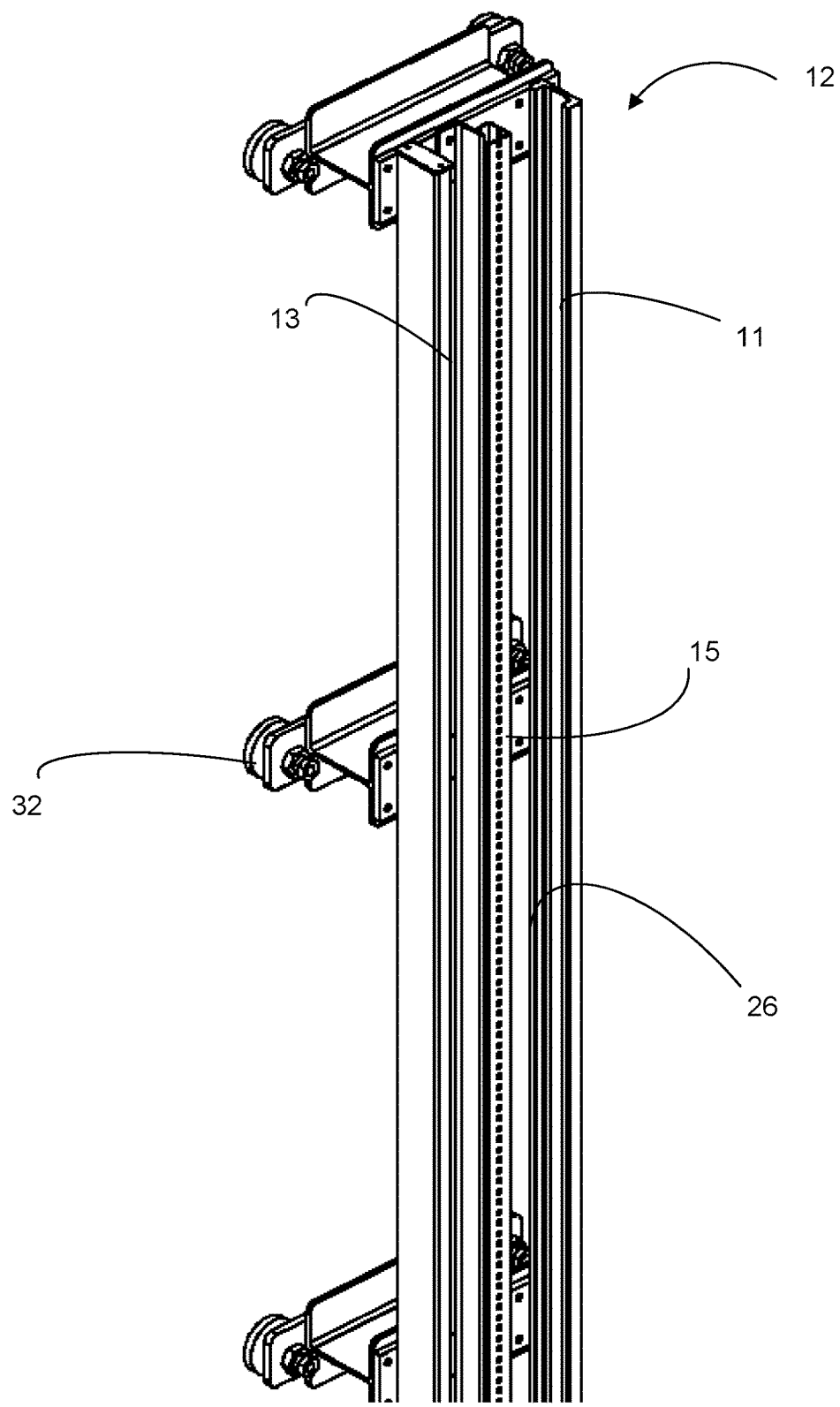
FIG. 3 shows a perspective view of a vertical positioning beam in accordance with a first preferred embodiment of the present invention.

With reference now to FIG. 3, an enlarged view of the vertical positioning beam 12 is provided. As shown, the vertical positioning beam 12 may preferably include an extended vertical track 26 having side channels 11, 13 which preferably may enclose and guide the rollers 38 (shown in FIGS. 5A and 5B) of the vertical locking bracket 14 as discussed below. Additionally, the vertical track 26 may include a central track/chain 15 which may preferably engage with a gear or other mechanism of the vertical locking bracket 14 to raise the vertical locking bracket 14 and the distal spacing beam 20 to a desired height. As shown, the vertical positioning beam 12 may preferably include securing mounts 32 to assist in securing and stabilizing the jumper positioning system 10. FIG. 4 provides an additional view of the connection between the vertical locking bracket 14 and the distal spacing beam 20.

Figure 5B:
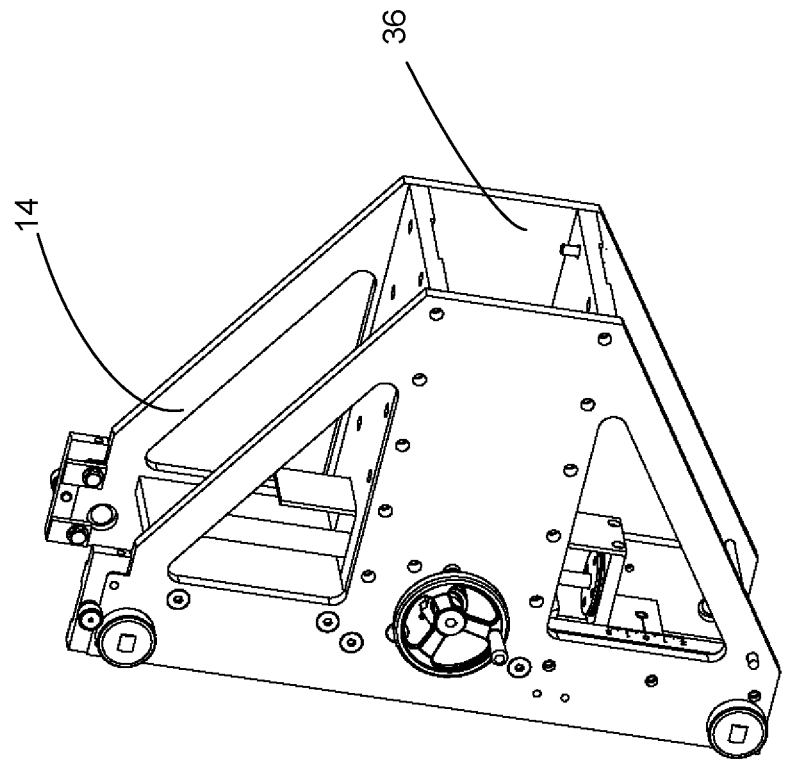
FIGS. 5A and 5B show two perspective views of an exemplary vertical locking bracket in accordance with a further preferred embodiment of the present invention.
Figure 5A:
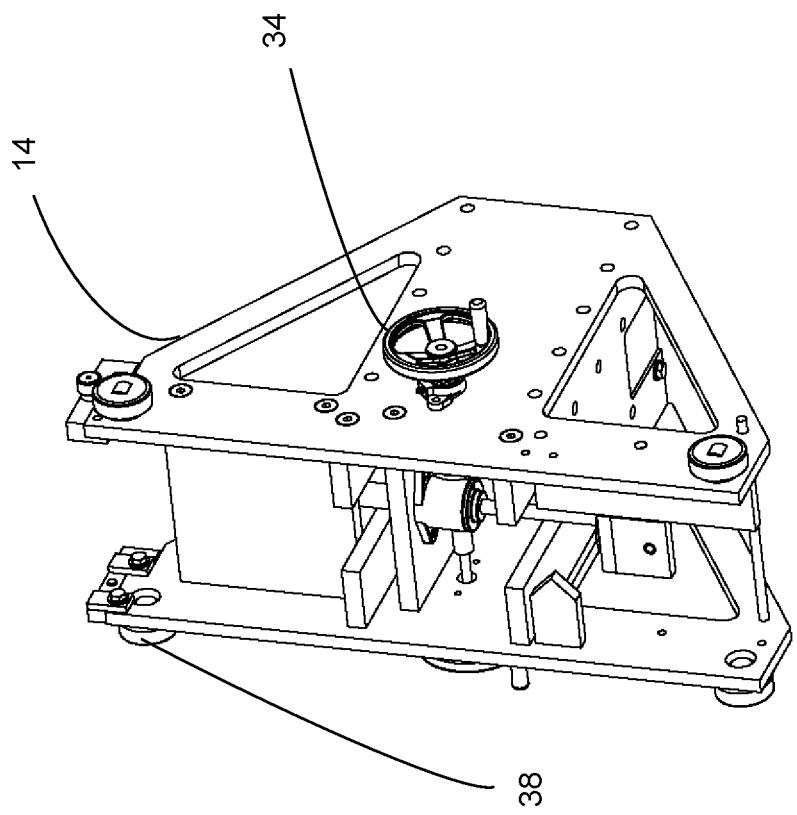

With reference now to FIGS. 5A and 5B, an exemplary vertical locking bracket 14 is shown. As shown, the vertical locking bracket 14 may preferably include rollers 38 as discussed above. Still further, the vertical locking bracket 14 may include a motor, gears and/or other mechanisms to provide the needed force to raise the vertical locking bracket 14 along the vertical positioning beam 12. For example, the vertical locking bracket 14 may include a manual crank 34 to provide the needed force. Additionally, the vertical locking bracket 14 may include a distal beam enclosure 36 which may preferably secure an end portion of the distal spacing beam 20 via pins, bolts, welds or the like.

Figure 6:
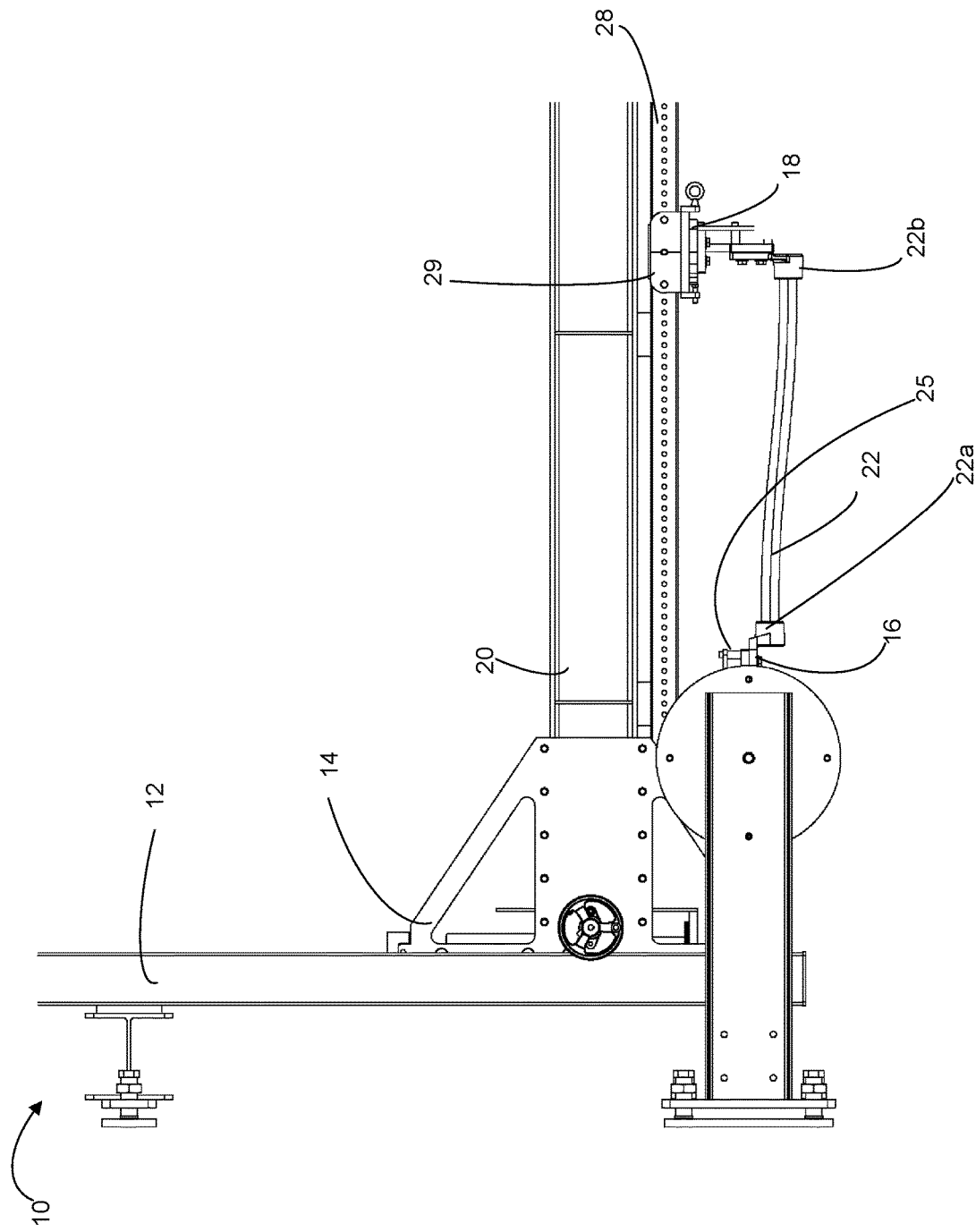
FIG. 6 shows a side view of the exemplary jumper positioning system shown in FIG. 1.

With reference now to FIG. 6, an enlarged side view of an exemplary jumper positioning system 10 of the present is shown. As shown, the jumper 22 is preferably secured on a distal end 22b to the beam track carriage 29 via a tool mount 18 as discussed below. Accordingly, the distal end 22b of the jumper 22 may be positioned anywhere along the length of the distal spacing beam 20. As discussed above, the proximal end 22a of the jumper 22 is preferably further connected to the horizontal track carriage 25 via a tool mount 16.

Figure 7:
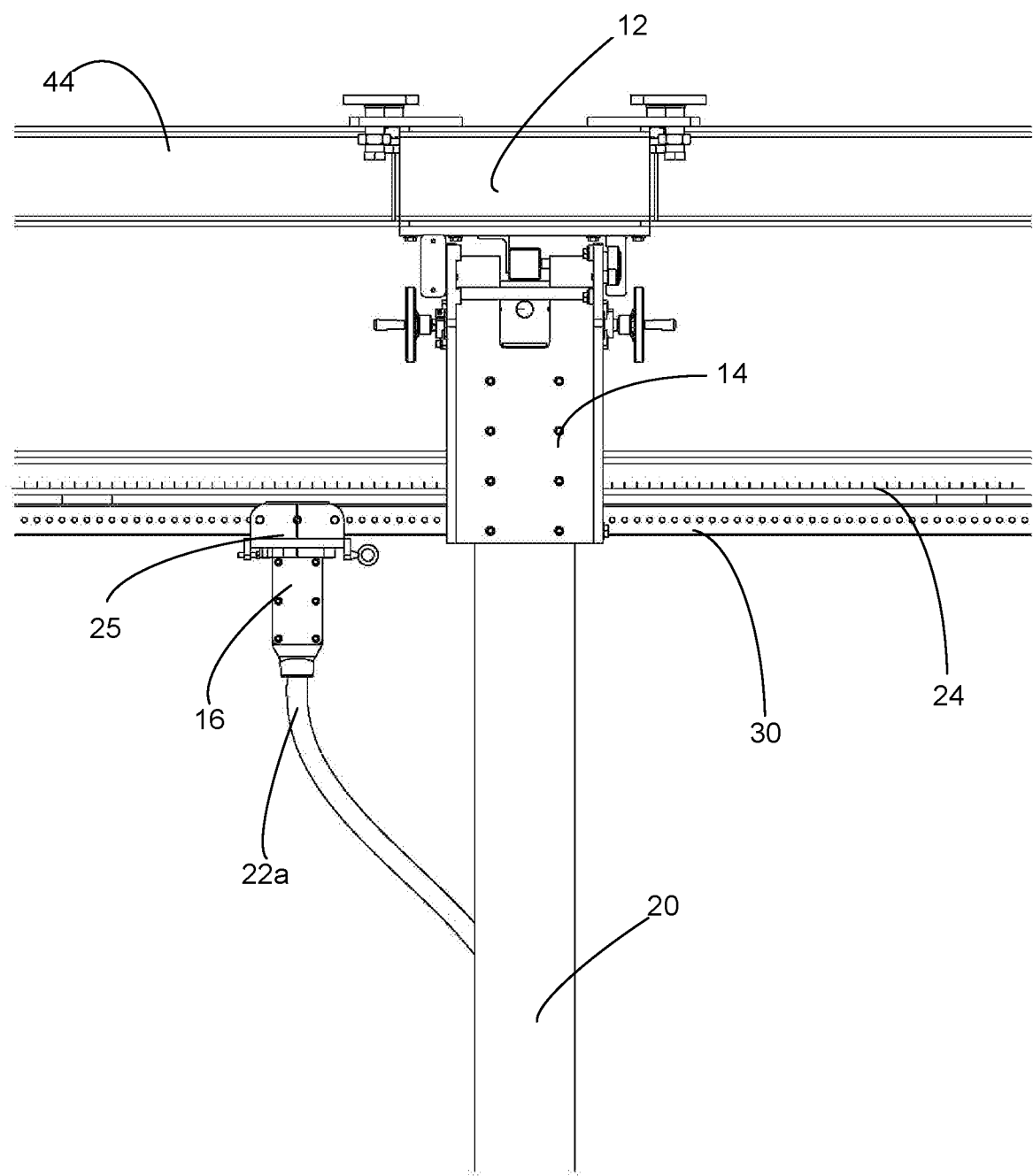
FIG. 7 shows a top view of the exemplary jumper positioning system shown in FIG. 1.

With reference now to FIG. 7, a top-down view of the exemplary jumper positioning system 10 is provided. As shown in FIG. 7, the vertical positioning beam 12 is preferably secured to a base support beam 44, and the vertical locking bracket 14 is secured to the distal spacing beam 20. Further, the proximal end 22a of the jumper 22 is shown attached to the horizontal track carriage 25 via a tool mount 16. Accordingly, the proximal end 22a of the jumper 22 may be positioned anywhere along the length of the horizontal base beam 24 via movement of the horizontal track carriage 25 along the horizontal track 30.

Figure 8:
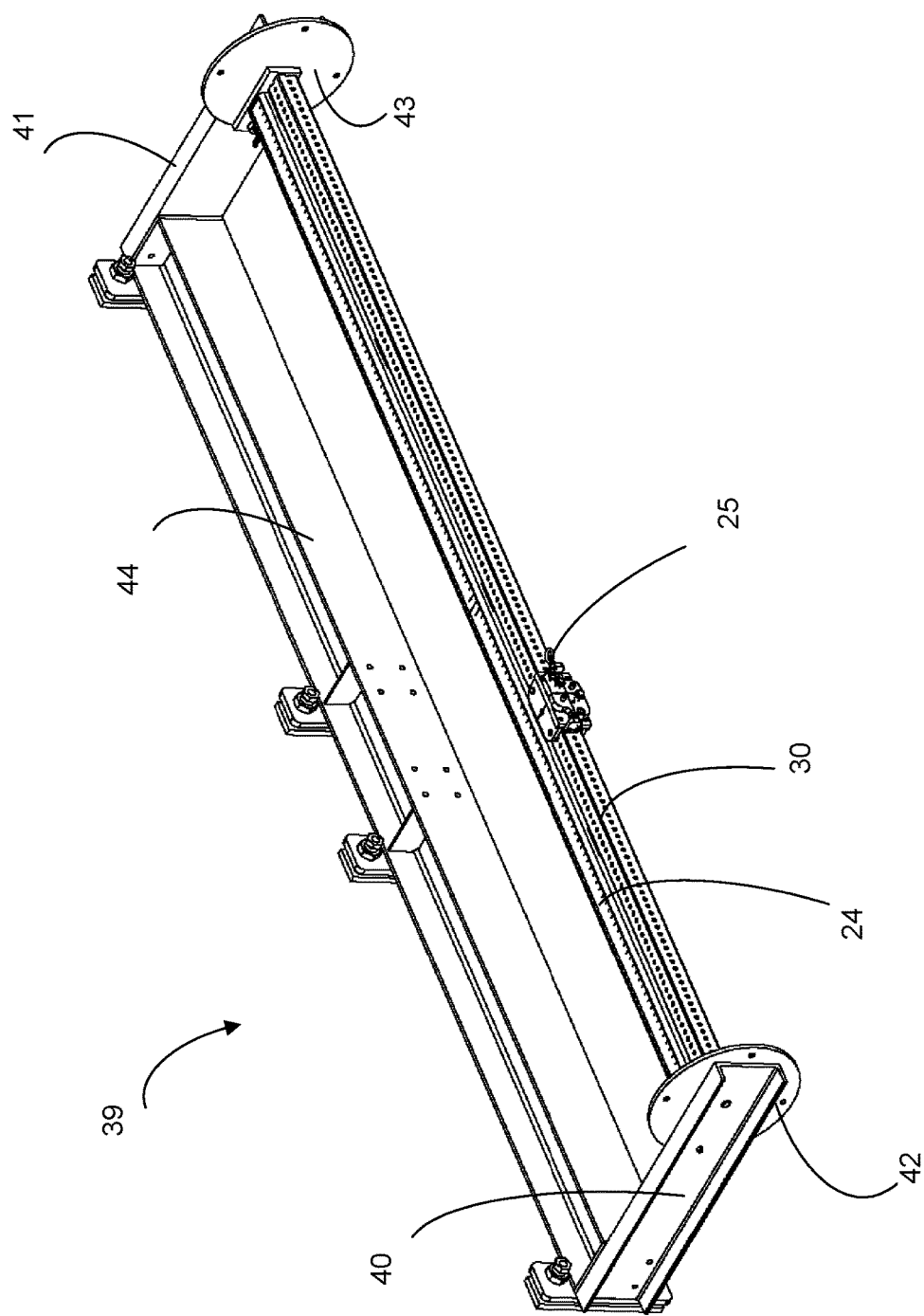
FIG. 8 shows a perspective view of an exemplary base assembly in accordance with a further preferred embodiment of the present invention.

With reference now to FIG. 8, a view of the base assembly 39 of the present invention is provided. As shown, the base assembly 39 preferably may include a base support beam 44 which is connected between base arms 40 and 41. The base arms 40, 41 preferably support a pair of horizontal track supports 42, 43 which are secured to each end of the horizontal base beam 24. As shown, the horizontal track 30 is preferably attached to the horizontal base beam 24. Further, the horizontal track carriage 25 is preferably slidably attached to the horizontal track 30 of the present invention as discussed below.

Figure 9:
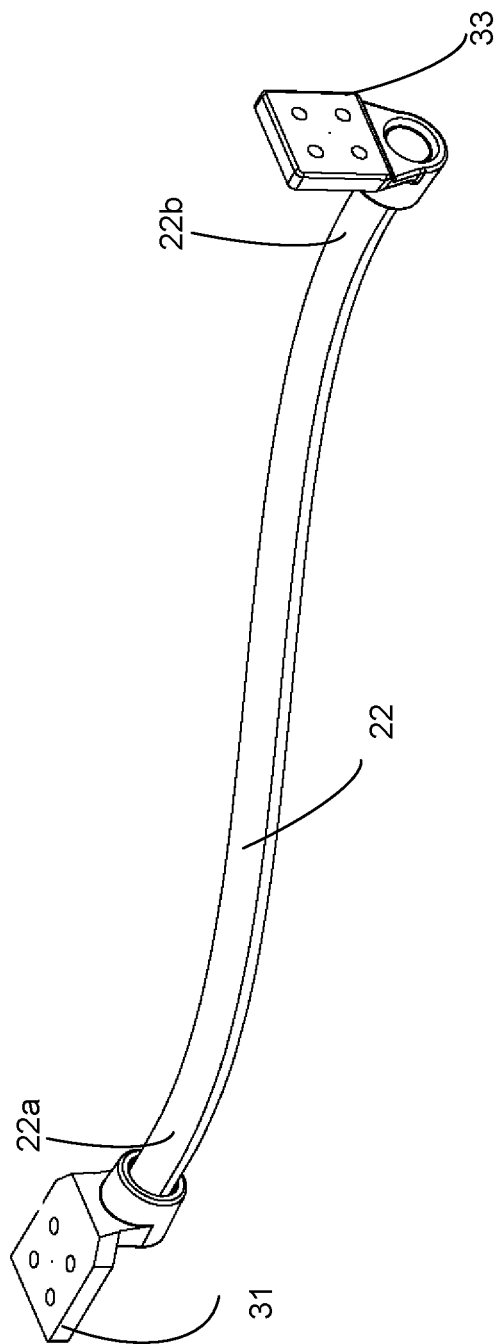
FIG. 9 shows a perspective view of an exemplary flexible jumper in accordance with a further preferred embodiment of the present invention.

With reference now to FIG. 9, the proximal end 22a and the distal end 22b of the jumper 22 may preferably be secured to respective jumper connectors 31, 33. Additionally, the jumper connectors 31, 33 may preferably include one or more bolt holes so that the jumper connectors 31, 33 may be attached to the horizontal track carriage 25 via the tool mount 16 and/or the beam track carriage 29 via a tool mount 18. Still further, the jumper connectors 31, 33 may preferably connect to any of a variety of other terminal end fixtures, tool mounts and other adapters as discussed below. The jumper connectors 31, 33 may also be provided in a variety of alternative configurations including any and all NEMA standard configurations.

With reference now to FIGS. 10-15, several exemplary carriages, terminal end fixtures, tool mounts and connection adapters (collectively "connection tools") are shown. As should be understood, each of these connection tools may be connected to either end of any jumper 22. Still further, each of the connection tools may be used individually or in any combination with any other connection tool(s) to provide connections between a jumper 22 and any other element of the system without limitation. Additionally, although specific configurations are discussed, the connection tools and mounting surfaces disclosed (such as connector mounting surfaces 48 and 56) may be configured in any of a variety of alternative configurations to match and mate with the design of the jumper connectors 31, 33 including any and all NEMA standard configurations.

Figure 10:
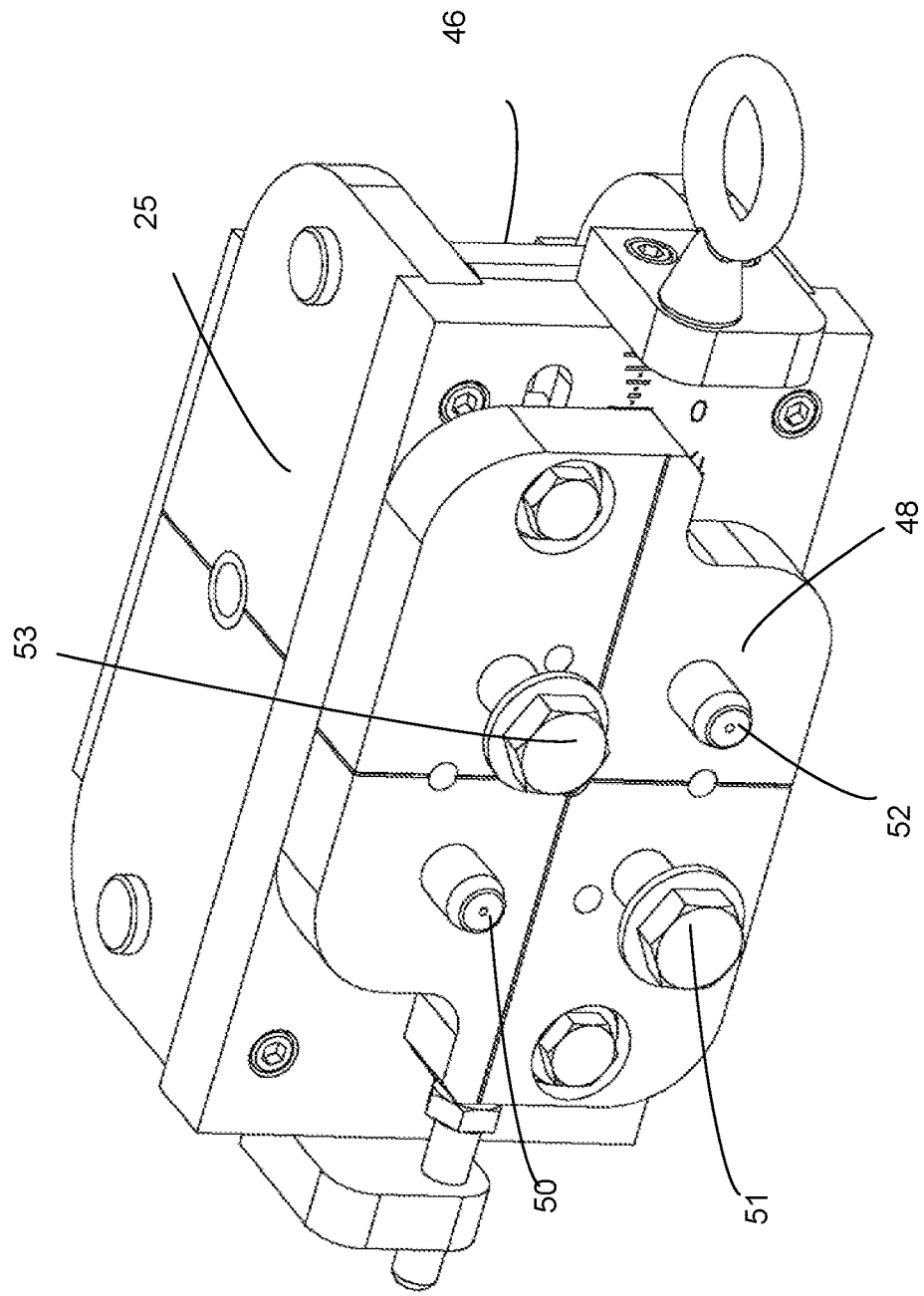
FIG. 10 shows a perspective view of an exemplary horizontal track carriage in accordance with a further preferred embodiment of the present invention.

With reference now to FIG. 10, an exemplary horizontal track carriage 25 is provided. As shown, the horizontal track carriage 25 is preferably slidably engaged with the horizontal track 30 so that it can be moved to a selected position along the horizontal base beam 24. According to a preferred embodiment, the horizontal track carriage 25 preferably may include a horizontal track engagement surface 46 to match and engage with the surface of the horizontal track 30. Further, the horizontal track carriage 25 may preferably also include a mounting connector surface 48. The mounting connector surface 48 may preferably include connector pins 50, 52 as well as securing bolts 51, 53 which may preferably mate with the bolt holes of a jumper connector 31, 33, a connection tool or the like.

Figure 11:
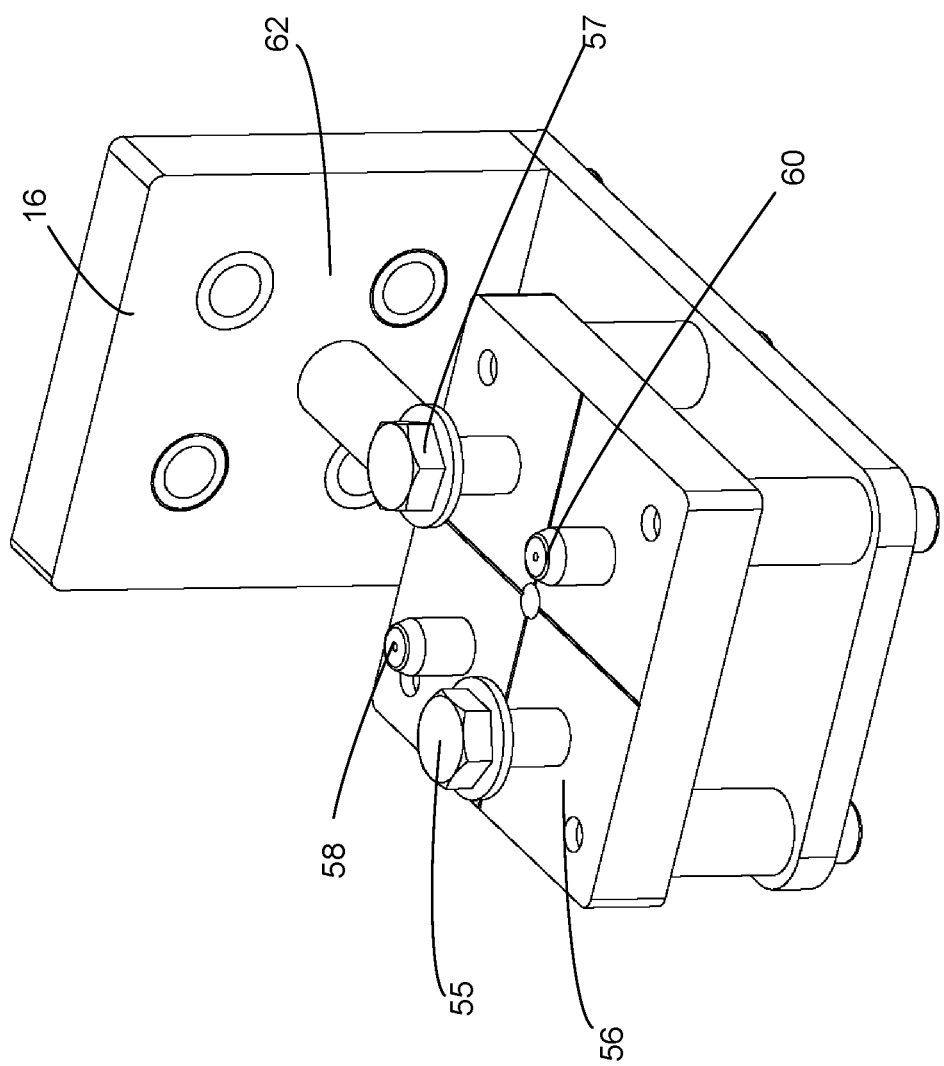
FIG. 11 shows a perspective view of an exemplary tool mount in accordance with a further preferred embodiment of the present invention.

With reference now to FIG. 11, an exemplary tool mount 16 is provided. As shown, the tool mount 16 preferably includes an angled mounting surface 62 and a connector mounting surface 56. The connector mounting surface 56 preferably may include a pair of connector pins 58, 60 as well as securing bolts 55, 57 which may preferably mate with the bolt holes of the jumper connectors 31, 33, a connection tool or the like as discussed above. In the example of FIGS. 1-3, a first exemplary tool mount 16 is shown with the connector mounting surface 56 mated with the proximate jumper connector 31/proximate end 22a of the jumper 22. Further, the angled mounting surface 62 of tool mount 16 is shown mated with the connector mounting surface 48 of the horizontal track carriage 25. Additionally, a second tool mount 18 is shown with its connector mounting surface 56 mated with the distal jumper connector 33/distal end 22b of the jumper 22. Further, the connector mounting surface 56 of the second tool mount 18 is shown mated with the beam track carriage 29.

Figure 12:
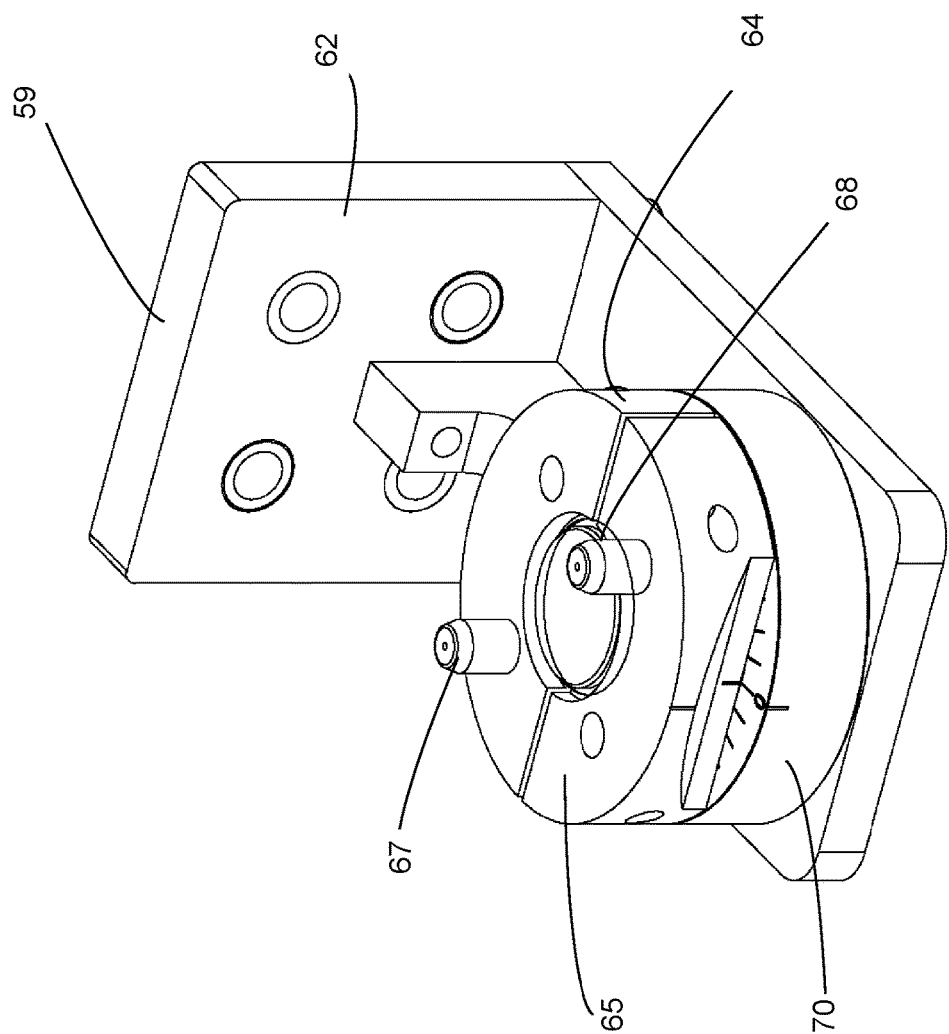
FIG. 12 shows a perspective view of an exemplary tool mount of the present invention with a rotary adapter in accordance with a further preferred embodiment of the present invention.
Figure 13:
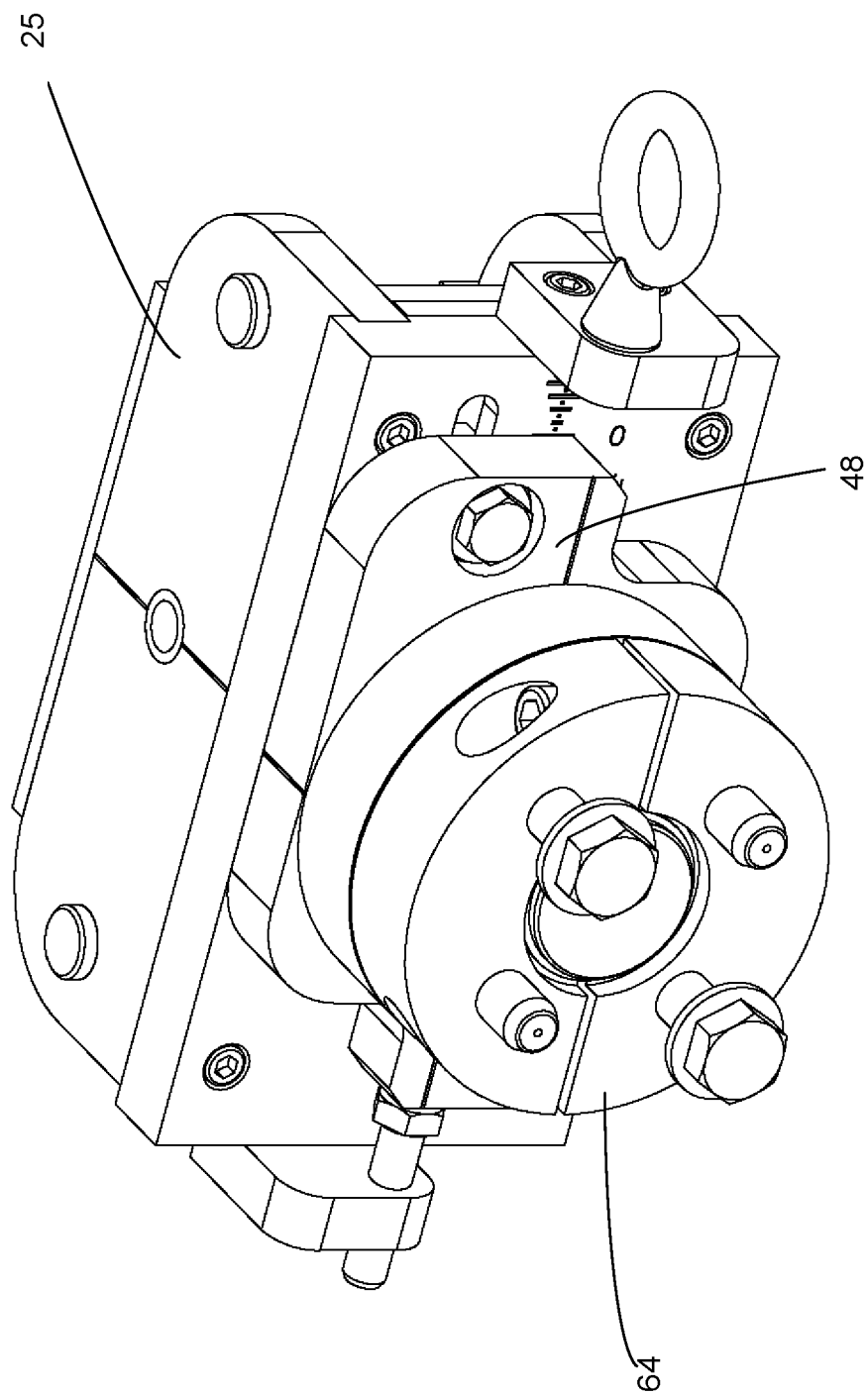
FIG. 13 shows an exemplary horizontal track carriage of the present invention with a rotary adapter in accordance with a further preferred embodiment of the present invention.

With reference now to FIG. 12, an exemplary rotary adapter 64 is shown mated with the tool mount 59 in place of the connector mounting surface 56 shown in FIG. 11. As shown, the rotary adapter 64 includes a rotary base 70, an upper mounting surface 65, and a pair of connector pins 67, 68. As shown, the upper mounting surface 65 is preferably rotatably connected to the rotary base 70 and may rotate relative to the rotary base 70 to a given rotary angle (i.e. 0°-360°). Accordingly, the orientation of any connection tool may be rotationally adjusted and positioned as desired. FIG. 13 shows the exemplary rotational adapter 64 attached to the connector mounting surface 48 of the horizontal track carriage 25 in accordance with a further preferred embodiment of the present invention.

Figure 14:
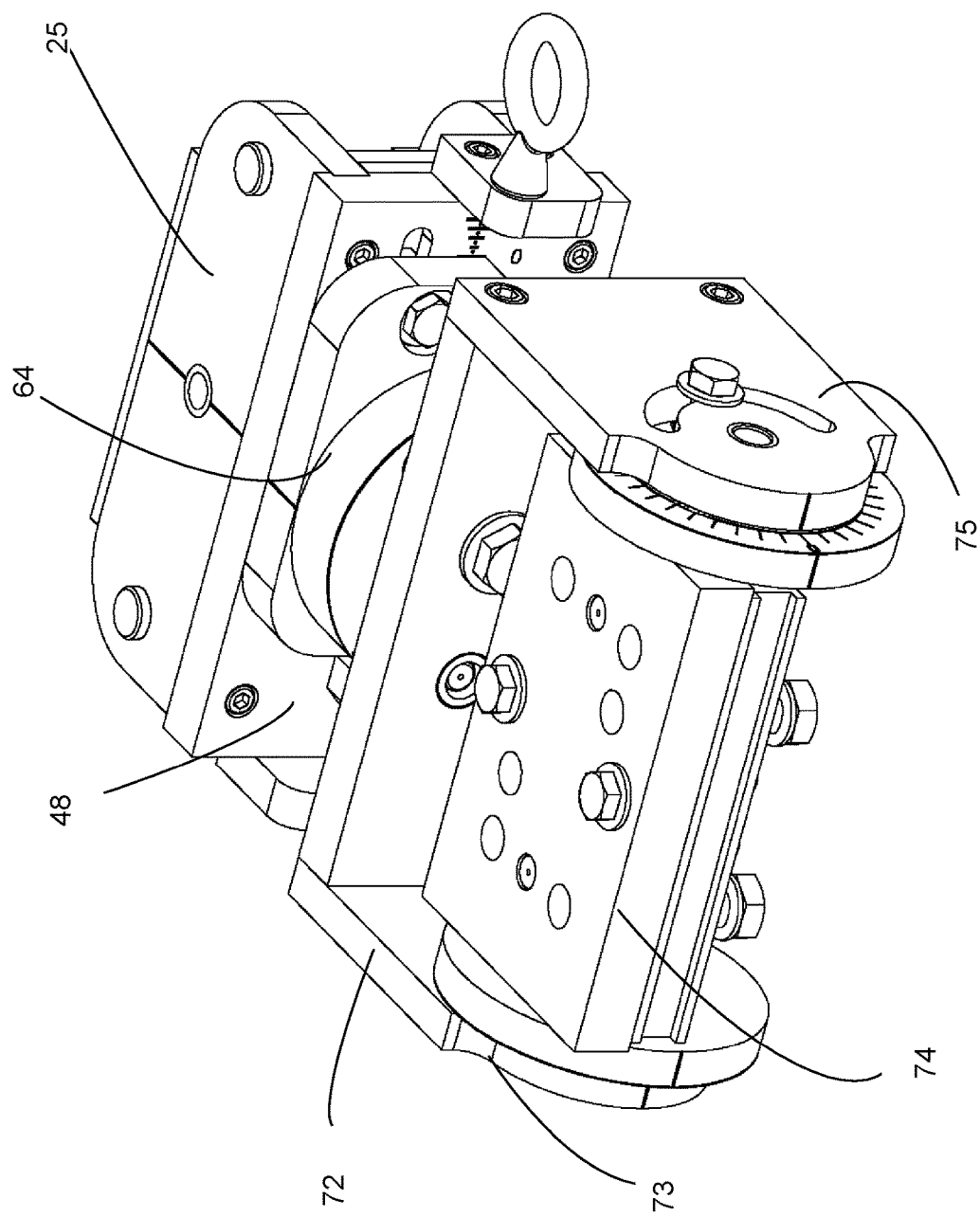
FIG. 14 shows an exemplary horizontal track carriage of the present invention with a rotary adapter and an exemplary compound angle adapter in accordance with a further preferred embodiment of the present invention.
Figure 15:
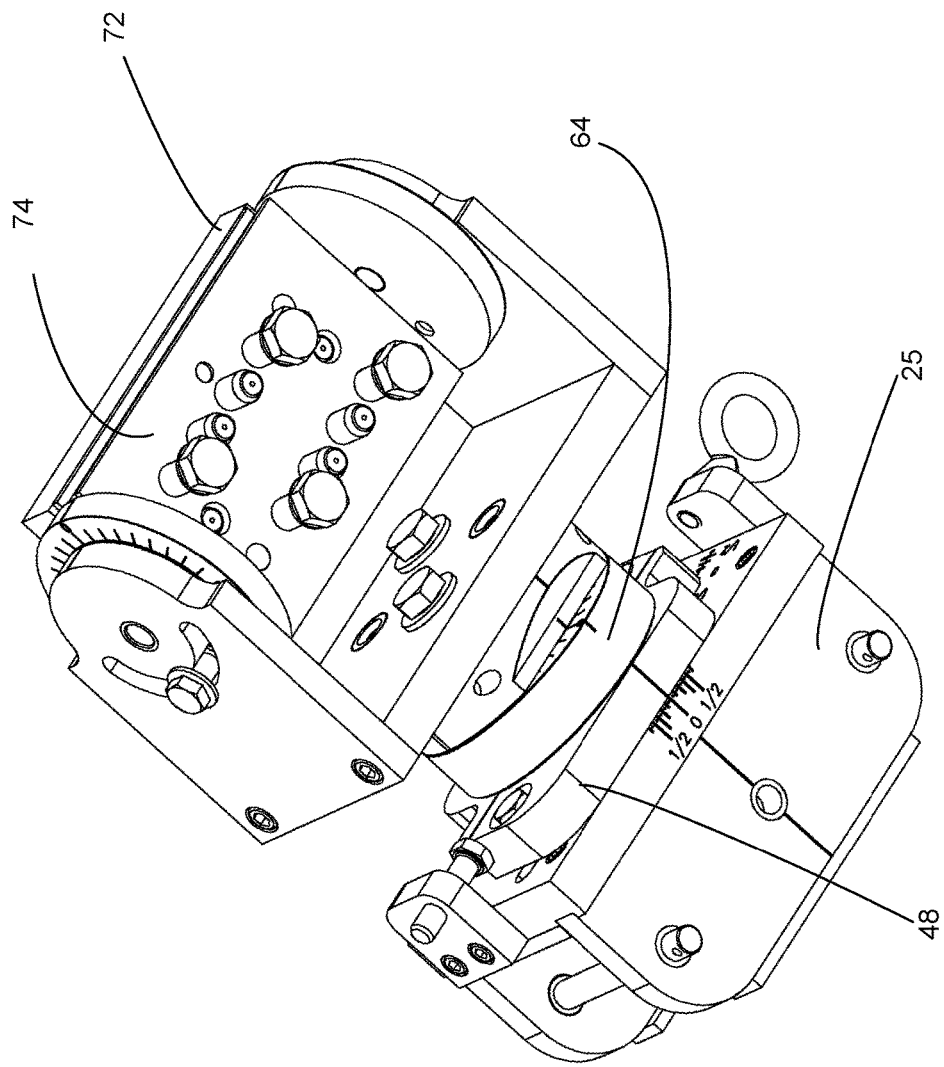
FIG. 15 shows an underside view of the exemplary horizontal track carriage of the present invention shown in FIG. 14.

In FIGS. 14 and 15, an exemplary compound angle adapter 72 is illustrated. As shown, the exemplary compound angle adapter 72 may preferably include an angle adapting mounting surface 74 which is preferably rotationally connected between a pair of support arms 73, 75. According to a preferred embodiment, the angle adapting mounting surface 74 may preferably rotate from +90° (where its primary axis is parallel to the connector mounting surface 48 of the horizontal track carriage 25) to −90° (where its primary axis has flip over to again be parallel to the connector mounting surface 48). As shown, a rotary adapter 64 may further be attached between the compound angle adapter 72 and the horizontal track carriage 25 to allow for rotation of the angle adapting mounting surface 74 as well.

Figure 16:
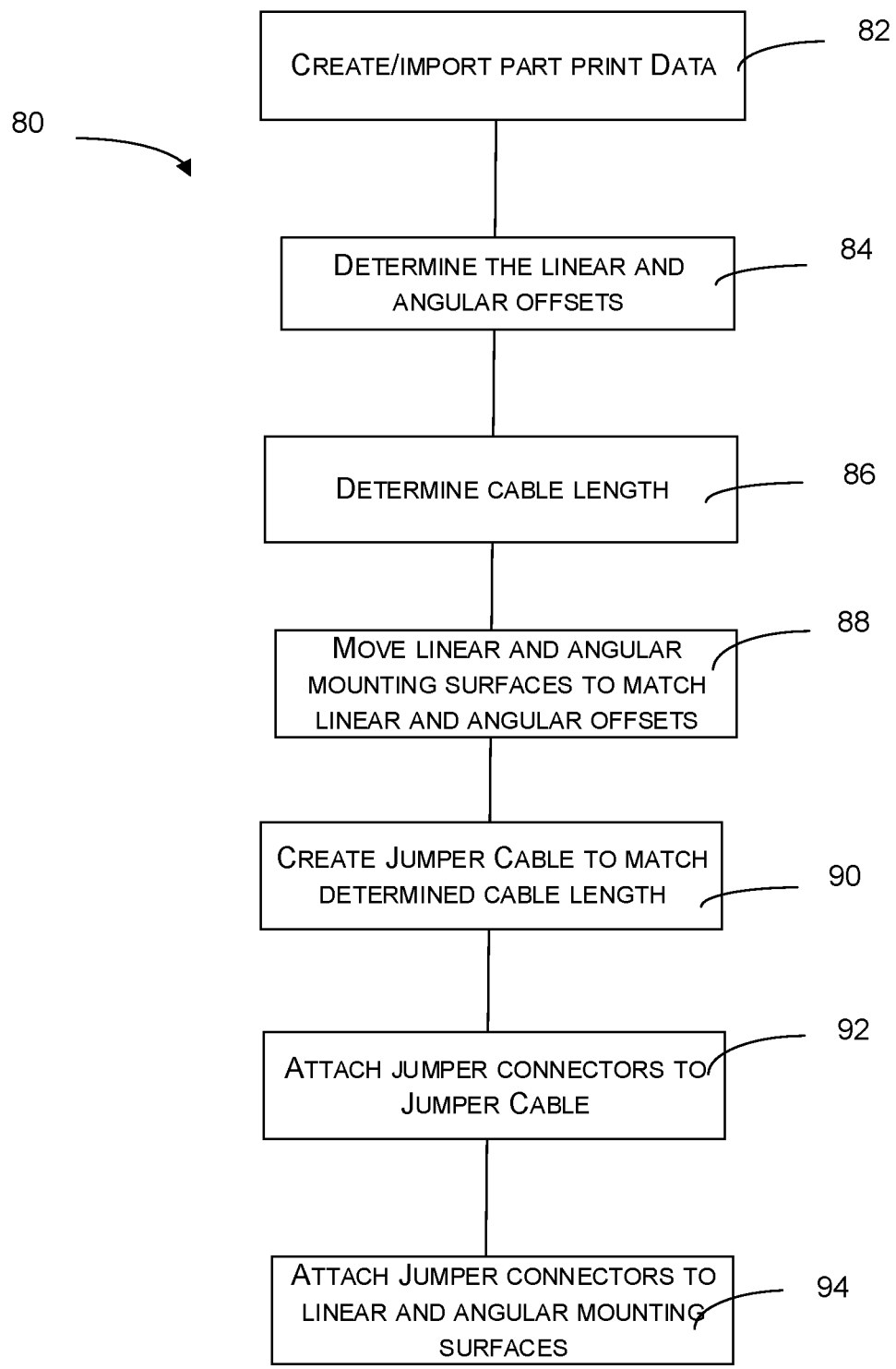
FIG. 16 shows an exemplary method for creating and setting the tooling position of a pre-fabricated jumper in accordance with aspects of the present invention.

With reference now to FIG. 16, an exemplary method 80 for creating and setting the tooling position of a prefabricated jumper in accordance with aspects of the present invention shall now be discussed. As shown in FIG. 16, an exemplary first step 82 preferably includes creating or importing part print data for the needed jumper. Preferably, the part print data includes the jumper/machine endpoints provided from a CAD model. Alternatively, the part print data may be collected from field measurements and manually entered.

In a next step 84, the linear and angular offsets for the needed jumper are determined. In a next step 86, an approximate value for the needed cable length between the determined endpoints is calculated. Preferably, this calculation takes into account the dimensions of the determined jumper connectors to be used. In a next step 88, the linear and angular mounting surfaces of the present invention are preferably positioned to match the determined linear and angular offsets. In a next step 90, the jumper cable is created to match the determined cable length. In a next step 92, the jumper cable is attached to the selected jumper connectors. In a final step 94, the jumper connectors are attached to the linear and angular mounting surfaces.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

The invention claimed is:

1. A system for positioning a flexible jumper having a first jumper end and a second jumper end, wherein the system comprises:
    a base assembly;
    an x-axis oriented rail; wherein the x-axis oriented rail is comprised of a first track; further wherein the system further comprises a first carriage; wherein the first carriage is slidably connected to the first track;
    a y-axis oriented rail; wherein the y-axis oriented rail is substantially orthogonal to the x-axis oriented rail in a first plane; further wherein the y-axis oriented rail further comprises a vertical track; further wherein the system further comprises a bracket element; further wherein the bracket element is slidably attached to the vertical track;
    a z-axis oriented rail; wherein the z-axis oriented rail is substantially orthogonal to the first plane; further wherein the z-axis oriented rail is comprised of a second track; further wherein the system further comprises a second carriage; wherein the second carriage is slidably connected to the second track; further wherein the bracket element is secured to the z-axis oriented rail so that the bracket element and z-axis oriented rail move together within at least a second plane;
    a first mounting tool, wherein the first mounting tool is attached to the first carriage; further wherein the first mounting tool comprises a first mounting surface for attaching to the first jumper end; and
    a second mounting tool, wherein the second mounting tool is attached to the second carriage; further wherein the second mounting tool comprises a second mounting surface for attaching to the second jumper end.

2. The system of claim 1, wherein the bracket element comprises a locking mechanism configured to lock the bracket element at selected positions along the vertical track.

3. The system of claim 2, wherein the y-axis oriented rail is secured to the x-axis oriented rail at a securing point within the base assembly.

4. The system of claim 3, wherein the first mounting tool is movably attached to the first track and configured to position the first end of the jumper at a first point in three-dimensional space; wherein the second mounting tool is movably attached to the second track and configured to position the second jumper end at a second point in three-dimensional space.

5. The system of claim 4, wherein the three-dimensional space is defined within the lengths of the y-axis oriented rail, the z-axis oriented rail and the x-axis oriented rail.

6. The system of claim 5, wherein the first and second points correspond with the relative positions between the first and second jumper ends when connected between a prefabricated substation terminal mount and an on-site terminal mount.

7. The system of claim 6, wherein the first jumper end is secured to the first carriage using the first tool mount; wherein the first carriage is mechanically engaged with the first track and configured to position and secure the first jumper end along the length of the first track.

8. The system of claim 7, wherein the second jumper end is secured to the second carriage using the second tool mount; wherein the second carriage is mechanically engaged with the second track and configured to position and secure the second jumper end along the length of the second track.

9. The system of claim 8, wherein the bracket element is mechanically engaged with the vertical track and movable in concert with the second carriage to position the second jumper end within the three-dimensional space.

10. The system of claim 9, wherein the vertical track comprises side channels; wherein the side channels enclose a plurality of rollers; wherein the side channels enclose and guide the rollers to allow the bracket element to move along the vertical track.

11. The system of claim 10, wherein the vertical track comprises a central track guide which comprises a plurality of openings configured to engage with a gear to raise the bracket element to a desired height; wherein the bracket element comprises a manual crank arm which is configured to turn the gear to raise the bracket element to a desired height.

12. The system of claim 11, wherein the base assembly comprises a base support beam, a first base arm and a second base arm; wherein the first and second base arms are parallel and extend out from the base support beam along the z-axis; wherein the x-axis oriented rail is supported between the first and second base arms.

13. The system of claim 12, wherein the system further comprises a plurality of jumper connectors; wherein the plurality of jumper connector comprise a first jumper connector and a second jumper connector; wherein the first jumper connector is attached to the first jumper end; wherein the second jumper connected is attached the second jumper end.

14. The system of claim 13, wherein the plurality of jumper connectors comprise one or more bolt holes; wherein the plurality of jumper connectors are configured to connect to a plurality of connection tools; wherein the connection tools comprise connection tools selected from the group of tools comprising: terminal end fixtures, tool mounts and connection adapters.

15. The system of claim 14, wherein the first carriage comprises a horizontal track engagement surface to match and engage with first track; wherein the first carriage further comprises a mounting connector surface; wherein the mounting connector surface comprises a plurality of connector pins.

16. The system of claim 15, wherein the first tool mount 16 comprises an angled mounting surface and a connector mounting surface; wherein the connector mounting surface comprises a plurality of connector pins.

17. The system of claim 16, wherein the system further comprises a rotary adapter.

18. The system of claim 17, wherein the rotary adapter comprises: a rotary base, an upper mounting surface, and a plurality of connector pins; wherein the upper mounting surface is rotatably connected to the rotary base; wherein the upper mounting surface may rotate relative to the rotary base.

19. The system of claim 18, wherein the system further comprises a compound angle adapter.

20. The system of claim 19, wherein the compound angle adapter comprises an angle adapting mounting surface which is rotationally connected between a pair of support arms.

* * * * *